3,700,447
PRODUCTION OF POSITIVE IMAGE BY DEVELOPING AN IMAGEWISE EXPOSED SEMICONDUCTOR ELEMENT WITH OXIDIZING AND REDUCING AGENTS
Leonard E. Ravich, Boston, Elliot Berman, Quincy, and Carl F. W. Ekman, Bedford, Mass.; said Ravich and said Ekman assignors to Itek Corporation, Lexington, Mass.
No Drawing. Continuation-in-part of application Ser. No. 199,211, May 14, 1962. This application May 2, 1968, Ser. No. 728,869
Int. Cl. G03c 5/24
U.S. Cl. 96—48                   9 Claims

ABSTRACT OF THE DISCLOSURE

In a process for recording an image pattern of activating radiation comprising exposing to an image pattern of activating radiation a copy medium comprising a photoconductor which becomes activated upon exposure to activating radiation and thereby capable of causing chemical reactions at portions of said medium corresponding to said image pattern of activating radiation and then applying to said copy medium a chemically reactive image-producing agent, the improvement comprising: either prior to or subsequent to the exposure step applying to the copy medium the first component of a two component image-forming agent reacting on contact at said activated portions to form reaction products which are chemically non-reactive with a second component of an image-producing agent, and then applying to said medium the second component of the image-producing agent to thereby form an irreversible image in the non-exposed areas.

---

This application is a continuation-in-part of copending application U.S. Ser. No. 199,211, filed May 14, 1962, now abandoned.

This invention relates to methods and devices for data storage, and relates in particular to data storage techniques and devices using semiconductor materials.

According to the invention, information can be stored in, or erased from, a semiconductor material by selective activation of the semiconductor surface with preselected patterns of activating and/or deactivating radiation. The information stored in the semiconductor can be read by treatment of the semiconductor surface with chemical agents preferentially to effect oxidation or reduction reactions at those portions of the semiconductor surface which are in an activated state, e.g., to produce visible patterns.

Thus, the invention is particularly suitable for image storage and reproduction. For example, an image, such as a photographic image, can be stored in a semiconductor in the form of a pattern of activated and unactivated semiconductor surface portions corresponding respectively with light and dark portions of the original image. The stored or latent image can be erased by deactivation of activated portions, if desired. Or the original image may be reproduced in the semiconductor storage medium by chemical development, involving redox reactions at the semiconductor surface, of the latent stored image to produce visible images.

As the semiconductor storage medium of the invention, radiation sensitive materials in which energetic electrons are raised to the conduction band of the materials by the impingement of activating means such as radiation, e.g., photons, thereon are broadly employable. Activating means according to this invention shall be called "activating radiation."

According to the invention, these semiconductor materials can be sensitized by a number of techniques such as doping with foreign ions, dye sensitization, heating, and the like.

Activation of the semiconductor surfaces is effected by exposure to radiation of sufficient energy to raise electrons into the conduction band of the semiconductor. Ultraviolet light of wavelength less than about 4000 A. is particularly suitable when the process of the invention is employed for image reproduction, for example. Sensitization of the semiconductors, for example by the dye sensitization techniques taught in copending application Ser. No. 122,985, incorporated herein by reference, can be employed to make the semiconductors sensitive to activation by radiation in the visible spectrum, which is also of great usefulness when employing the process of the invention for image formation.

The irradiated semiconductor is a data storage medium: that is, substantial time periods may intervene between activation of the semiconductor by exposure to a radiation pattern to store information in the semiconductor and either erasure of the stored data or reading of the stored information by using the activated semiconductor surface to effect redox reactions by contact with suitable oxidizing and/or reducing agents.

The invention is broadly applicable to the oxidation, at an activated semiconductor surface, of substances having a redox potential comparable in value with those of formaldehyde, formate, acetate, citrate, oxalate, etc., in their oxidation to carbon dioxide and water. The substances to be oxidized may be molecular, atomic, ionic, organic or inorganic. Thus, the invention is applicable, for example, to the oxidation of dyestuffs and simple or complex anions and cations, metallic or non-metallic. Similarly, the invention is brodaly applicable to the reduction of substances having a redox potential comparable in value to those of silver ion or mercuric or mercurous ion in their reduction to the free metal, and is applicable to the reduction of inorganic and organic molecules, atoms, and ions, such as ions of gold and the other noble metals, dyestuffs such as methylene blue, and the like.

The photoconductor or semiconductor preferred in this invention are metal containing photoconductors. A preferred group of such photosensitive materials are the inorganic materials such as compounds of a metal and a non-metallic element of Group VI-A of the Periodic Table [1] such as oxides, such as zinc oxide, titanium dioxide, lead monoxide, red lead oxide, silicon dioxide, aluminum oxide, chromium oxide, zirconium dioxide, germanium dioxide, indium trioxide; metal sulfides such as cadmium sulfide, zinc sulfide and tin disulfide; metal selenides such as cadmium selenide. Metal oxides are especially preferred photoconductors of this group. Titanium dioxide is a preferred metal oxide because of its unexpectedly good results.

Also useful in this invention as photoconductors are certain fluorescent materials. Such materials include, for example, compounds such as silver activated zinc sulfide, zinc activated zinc oxide.

While the exact mechanism by which this invention works is not known, it is believed that exposure of photoconductors or photocatalysts of this invention to activating means causes an electron or electrons to be transferred from the valence band of the photoconductor or photocatalyst to the conductance band of the same or at least to some similar excited state whereby the electron is loosely held, thereby changing the photoconductor from an inactive form to an active form. If the active form of the photoconductor or photocatalyst is in the presence of an electron accepting compound a transfer of electrons will take place between the photographic and the electron

---

[1] Periodic Table from Lange's Handbook of Chemistry, 9th edition, pp. 56–57, 1956.

accepting compound, thereby reducing the electron accepting compound. Therefore a simple test which may be used to determine whether or not materials have a photoconductor or photocatalytic effect is to mix the material in question with an aqueous solution of silver nitrate. Little, if any, reaction should take place in the absence of light. The mixture is then subjected to light. At the same time that a control sample of an aqueous solution of silver nitrate alone is subjected to light, such as ultraviolet light. If the mixture darkens faster than the silver nitrate alone, the material is a photoconductor or photocatalyst.

When employed as data storage media according to the present invention, the semiconductor materials previously discussed herein can suitably be employed in bulk, e.g., in the form of a continuous layer. When used in image forming processes, the semiconductors are conveniently applied to a suitable backing which may be either porous or nonporous, such as of paper, wood, aluminum, glass, and the like. The semiconductors, which are suitably used in the form of finely divided particles, may simply be deposited on the surface of such a backing, or can be deposited on such a backing in a hydrophobic or, preferably, hydrophilic binder known to those skilled in the art of making radiation sensitive papers. Suitable hydrophobic binders, for example, include the silicone resin binders commonly used in the preparation of papers for electrostatic printing processes, or polyvinyl acetate binders. Typical, for example, of the preferred hydrophilic binders having a limited water solubility are gelatin, polyvinyl alcohol, and ethyl cellulose. Particularly advantageous results are employed when the finely divided semiconductor is merely dispersed in the interstices of a fibrous backing such as of paper, the fibers of the backing acting to lock in and to hold the semiconductor particles in the finished structure. For example, the semiconductor is easily incorporated in paper during its manufacture by methods known in the paper-making art.

The hydrophilic binders having a limited water solubility are especially preferred because of the rapid processing of the exposed copy medium that is possible especially with aqueous or other polar solvent processing solutions. Furthermore, the limited solubility prevents the photosensitive layer from being washed off by the processing baths. For example, a 9" x 9" exposed copy medium coated with $TiO_2$ in such a binder is rapidly processed by contacting with a silver nitrate solution, a solution of reducing agent, and a fixer solution in a total of 2 seconds. The processing solutions are at a temperature of about room temperature. A visable image of good density is produced. The binder is not dissolved or washed off during this processing.

The hydrophilic binder materials useful in the photosensitive composition of this invention include, for example, polyvinyl alcohol, starch, ethylcellulose, carboxymethylcellulose, casein, gelatin, sodium alginate, water-soluble vegetable gums such as guar gum, synthetic polymers such as sodium or ammonium polyacrylate, and many other water-soluble hydrophilic film-forming colloids or colloidal agglutinants.

These hydrophilic materials may be insolubilized in order to improve their durability by methods known to the art. For example, gelatin may be hardened by the addition of formaldehyde, and polyvinyl alcohol is effectively insolubilized by dimethylolurea incorporated with the coating formulation.

Hydrophilic fillers useful for incorporating in the hydrophilic materials are clay, calcium carbonate, silica, infusorial earth, chalk, barium sulfate, satin white or the like.

A polyvinyl alcohol binder used with titanium dioxide as the photosensitive compound gives an unexpectedly good result as a copy medium. This photoconductor binder system has the advantage of giving improved image densities for a given exposure, improved photographic speeds, and blacker images when using a silver nitrate development system. Especially unexpected is the extremely rapid processing attainable by this system. For example, using a titanium dioxide-polyvinyl alcohol binder system processing speeds of 4½ inches per second are attainable in a developer system comprising an aqueous solution of silver nitrate and a Metol developer. Using the same developer system several other binder systems, such as an acrylic vinyl latex (Nelco 260) or vinylmaleate (Nelco 460), were tested with titanium dioxide as the photoconductor. The maximum processing speed attainable to achieve the same image density was 2 inches per second. In all of the above-mentioned tests the ratio of titanium dioxide to binder was 4 parts by weight of $TiO_2$ to 1 part by weight of binder. This ratio can be varied from about 2:1 to about 10:1, but is preferably from about 3:1 to about 6:1.

As mentioned earlier, the sensitivity of the semiconductor materials may be increased by admixture of dyes with the semiconductors. For example, commercially available Rose Bengal papers have been employed in the process of the invention with good success. As known in the art, these papers comprise finely divided zinc oxide in a hydrophobic binder together with a sensitizing Rose Bengal dye.

In general, the semiconductors of the invention are rendered active by exposure to ultraviolet light, that is light of wavelengths less than about 4000 angstroms. For example, zinc oixde is particularly sensitive to ultraviolet light of wavelengths between about 3650 A. and 4000 A. By dye sensitization the semiconductors can be made more sensitive in the visible spectral region, such that the semiconductor can be activated by exposure to a tungsten source, such as a photoflash lamp, for example.

The time during which the semiconductors are exposed to a light source for activation varies with the nature of the light source, the distance of the semiconductor from the source, the strength of the source, and the intrinsic sensitivity of the semiconductor being exposed to the activating radiation, all of which are factors analogous to those involved in any conventional photographic process, and are well within the skill of those familiar with the photographic arts. By way of illustration, it can be indicated that, in practicing the present invention, successful exposures have been made to activating radiation using high intensity photoflash units giving exposure times as low as a fraction of a millisecond.

As indicated earlier, a principal advantage of the present invention, particularly when used in image-forming techniques, is the fact that erasure by deactivation, or development, can be remote from activation by exposure to activating radiation unlike the process disclosed in French Pat. 1,245,215. Thus, for example, latent images formed in the activated semiconductor surfaces of the present invention are retained in the semiconductor for periods of from about 2–10 hours, and can be voluntarily erased during this period, or converted to visible images if desired. The length of time for which specific exposed or activated media may be stored is dependent upon numerous factors affecting the decay of photoconductivity in the semiconductor involved. These factors include the quantity and quality of the activating radiation, and inherent qualities of the semiconductor exposed. For example, photoconductivity can be raised by doping, e.g. these semiconductor materials can be doped with minor amounts of foreign ions of such metals as aluminum or chromium. Mixtures of these foreign ions may be used. In general, the preferred amounts of these ions are from about 0.01% to about 5.0% by weight of the photoconductor. Also, as mentioned earlier, the presence of dyes will broaden the spectral sensitivity of semiconductors. Finally, the development of a stored latent image into a satisfactory visible image after periods of time long after activation of the semiconductor storage medium is also dependent on the discrimination of the developer in detecting low level differences between the properties of activated and unactivated semiconductors.

When information stored in a semiconductor according to the present invention, for example, as a latent image, is read by using the activated semiconductor surfaces to effect chemical reactions developing a visible pattern or image, such development may involve processes in which visible image formation is caused by reactions directly dependent in magnitude or extent on the quantity of radiation incident on the semiconductor during exposure, or may involve processes which give intensification of the latent image. The latter type of development is preferred, since it enables the production of visible images even when activation of the semiconductor has been minimal. Processes not involving image intensification can be employed to give visible images if the semiconductor has been sufficiently strongly activated by radiation, or can be used with minimally activated semiconductor materials to produce "latent (invisible) developed images" which can be made visible by further development with intensification as hereinafter explained.

In these development processes, a liquid developer is preferably employed to assure a convenient speed of development. The liquid may be water, or any organic liquid which will dissolve the developing agents and which is without adverse effect on the semiconductor. For example, water, methanol and/or other lower alcohols, or mixtures of methanol and/or other lower alcohols with water have been conveniently employed when soluble silver salts such as silver nitrate are employed as the developing agents. In case dyes are employed as the developing agents, acetone or other polar liquids can be suitably employed as liquid media for the agents. The use of a liquid developer does not imply that the semiconductor need be immersed in the liquid, or even be made wet to the touch, for development to occur.

In those development processes which do not involve any image intensification, and which do not produce visible images unless the semiconductor surface has been highly activated by long exposure to activating radiation (or by exposure to intense sources of such radiation), solutions of silver, gold, mercury, copper, and other noble metal ions are convenient developing agents. These ions, or other materials of comparable redox potential such as dyes like methylene blue, are reduced at activation semiconductor sites such that no more than one molecule or atom of the developing agent is reduced for each activated site produced in the semiconductor by photon bombardment during exposure to activating radiation.

Thus, if the degree of semiconductor activation is high, the quantity of, for example, metallic silver formed by reduction of silver ion during development will be sufficient to form a visible image. If not, a "latent developed image" will be produced in the semiconductor. Such an image is not subject to photoconductive decay, as is the latent image in the semiconductor before development, can be stored for long periods, and can be developed at will by development processes involving image intensification.

In image intensification development, materials such as univalent silver ion, mercurous ion, and mercuric ion, which are reducible by the light-activated semiconductor to finely divided black-appearing metallic silver or mercury, are used with chemical redox systems, preferably organic redox systems such as hydroquinone, "Metol" (p-methyl-amino-phenol sulfate), and the like. The ions and redox systems are contacted with an activated semiconductor surface separately or in admixture. It will be recognized that these redox systems and combinations, particularly the combinations with silver ion, are those commonly employed as developers in silver halide photography. However, other redox systems and/or other reducible substances having a reduction potential comparable to that of silver ion or of mercurous ion can also be employed in formulating developers. Thus, ionic gold, and other ionic noble metals may be substituted for silver ion, for example.

Image intensification using these developers results from the fact that mixtures of metal ions with organic reducing agents of the type described are highly sensitive to metal, e.g., metallic silver or mercury, deposited by reaction of silver or mercury ions at activated semiconductor sites. Upon precipitation of metal at these sites, for example from a mixture of metal ion and chemical redox system, further precipitation of metal from the mixture occurs preferentially at the sites where metal is already present. Or, for example, metal may be deposited from a solution of metal ion contacted with an activated semiconductor in the absence of a chemical redox system. Although the quantity of metal deposited may be too small to give a visible image, contacting the semiconductor with a chemical redox system such as hydroquinone-quinhydrone will cause further preferential deposition of residual silver ions as silver at the sites where the first silver was deposited, thus intensifying the first image.

This second reaction is purely chemical, and proceeds independently of photon activation of the semiconductor (i.e., with a quantum efficiency greater than 1), such that intense images can be formed even where activation of the semiconductor has been minimal. Thus, the "latent (invisible) developed images" earlier mentioned can be made visible by a second development involving intensification. Even the process of French Pat. 1,245,215, in which a zinc oxide surface is sensitized and simultaneously developed by the presence of silver ion on the semiconductor surface at the time of exposure, can be improved by using the developers of the present invention to intensify the image formed. Thus, the process of the French patent will not ordinarily produce visible images without infeasibly long exposure times. However, the feeble metallic silver image directly produced by the process of the French patent can be used as a nucleus for preferential deposition of further silver or mercury to give visible images as herein disclosed.

Intensification of "latent developed images" or feebly visible images can also be effected by uniform exposure of the image to radiation preferentially causing darkening of the image without a correspondingly great darkening of the background (i.e., by exclusion of the so-called "fog band" from the intensifying radiation). This technique, as applied to silver halide photography, is discussed, for example, by J. H. Jacobs in "Photographic Science and Engineering," volume 5, page 1 (1961).

The developing techniques just discussed will form images in the semiconductor surface which are negatives of the images to which the semiconductor was originally exposed. For example, opaque deposits of metallic silver will form on those portions of the semiconductor surface which are light activated and correspond with those portions of the original image which are transparent to light. However, the present process can also be used to produce positives of the original image.

For example, a semiconductor surface can be uniformly activated by flooding it with activating radiation such as ultraviolet light. Next, the surface may be selectively deactivated by exposure to a pattern of deactivating radiation, such as an infra-red image. On development, the opaque portions of the developed image will correspond with the opaque portions of the infra-red image, giving a positive print.

In a second method for producing positives, the semiconductor is exposed to a pattern of activating radiation. The surface is then treated with a chemical agent such as formaldehyde, which is spent, by oxidation to formic acid or carbon dioxide and water, at activated semiconductor sites. On subsequent development, e.g., with silver ion, metallic silver will be deposited by reaction with formaldehyde wherever the formaldehyde has not already been removed by reaction with the semiconductor. Thus, opaque areas will form where the semiconductor was not activated, i.e., where the original image was opaque. As another example, the surface may first be treated with hydrogen peroxide, which is decomposed at activated semiconductor sites. The surface is then treated with an iodide solution and dark-colored iodine is formed in areas where undecomposed peroxide is still present on the semiconductor surface.

The speed of development reactions in the present invention can be increased by the presence of easily oxidizable organic substances such as formate or formaldehyde, acetate, citrate, oxalate, etc. at the semiconductor surfaces. When materials such as silver ion are reduced at the semiconductor surface to form metallic silver during development, it is evident that some other agent is supplying the necessary electrons, i.e., is being oxidized. The mechanism of the reaction is not exactly known: the reducing agent may be $H_2O$, $OH^-$, or $O^=$, for example. However, the organic substances mentioned above appear to aid in furnishing electrons for the speedier reduction of reducible ions such as silver used in development. Also, the easy oxidizability of methanol may be responsible for the particularly good results observed when methanol is present in a developer, e.g., as the liquid component thereof.

For the developing techniques taught herein, the time for development will vary, as known in the art, with the exposure, the concentration of developer, the temperature, and other factors known to those skilled in the photographic arts.

After development, the semiconductor surfaces of the present invention, containing visible or "latent developed" images, are rendered incapable of further development on exposure to light by thorough washing, for example in water and/or alcohols such as methanol. If desired, the washing solution may contain a solubilizing or complexing agent to aid removal of residual developer from the semiconductor surface. Such solutions, analogous to the "hypos" employed in silver halide photography, solubilize any remaining developer, e.g., silver ion, on the semiconductor and facilitate its removal by washing. Of course, it will be understood that only soluble developer species are normally present in the present process. However, solubilizing or complexing agents may be useful in favoring the taking up of silver ion into solution over its adhesion to a semiconductor surface.

A better understanding of the invention and its many advantages will be had by reference to the following examples, given by way of illustration.

EXAMPLE 1

A number of 1 in. x 3 in. glass slides were covered with a film of finely divided titanium dioxide by placing them in a tray, covering them with a slurry of the oxide, letting the oxides settle on the slides and then drying the slides. The slurry employed comprised 400 ml. of water, 6 ml. of a 10.7% aqueous solution of polyvinyl alcohol, and 2 grams of commercial $TiO_2$ (rutile) of a particle size between about 0.3–0.4 micron.

The finished slides were exposed through the focal plane shutter of a "Graflex" camera box using a 100 watt "Hanovia" mercury lamp as the source. The lamp and camera box were mounted on an optical bench such that the light source and the slide to be exposed were separated by a distance of about 8 in. A number of exposures were made between 0.01 second to 0.20 of a second or greater. On development, very distinct images were obtained.

The exposed slides were developed in a solution comprising 0.04 gm. of hydroquinone in 100 ml. of methanol, saturated with silver nitrate (about 2–3 grams in the system). The developer was dropped onto the exposed slides with a dropper. Image formation occurred in time periods between about 15 seconds and 1½ minutes, or when the methanol had almost completely evaporated from the slide surface. The speed of development can be increased by evaporating the methanol with a stream of air. After drying, the slides were washed in fresh methanol.

Alternatively, the slides are developed by first contacting them with methanol saturated with silver nitrate, and then with a solution of hydroquinone.

Other soluble silver salts can be substituted for the nitrate, e.g., $AgClO_4$, or soluble mercurous or mercuric salts, such as the nitrates or fluorides, can be used.

EXAMPLE 2

A "Commercial Rose Paper," having a surface of zinc oxide sensitized with Rose Bengal dye, was exposed in an exposure box for one second using two 4-watt fluorescent lamps as the ultraviolet source. The papers were developed in a solution containing 200 ml. of methanol saturated by the addition of 5 grams of silver nitrate, and 2 ml. of a hydroquinone solution containing 8 gm. of hydroquinone in 200 ml. of methanol. The developer was applied to the exposed paper, and an image appeared in about one minute. The developed papers were then washed for about 2 to 3 minutes in water.

The speed of the paper can be improved by dipping the paper in a solution of formaldehyde and methanol before exposure.

Zinc oxide sensitized with numerous dyes as taught in copending application Ser. No. 122,985 can be used to prepare other sensitive papers for similar exposure and development.

EXAMPLE 3

A number of titanium dioxide coated glass plates prepared as in Example 1 were sensitized by immersion in a methanol solution saturated with silver nitrate prior to exposure in the "Graflex" arrangement employed in Example 1.

One series of exposed plates was developed in a silver free solution of 0.04 gram of hydroquinone in 100 ml. of methanol. The only silver ion present during development was that adhering to the plate from the presensitization step. In Table 1 below are shown the optical densities of the most dense portion of a test pattern obtained for various exposure times.

TABLE I

| Exposure time: | Optical density [1] |
|---|---|
| 1/30 | 0.24 |
| 1/20 | 0.33 |
| 1/10 | 0.38 |
| 1/5 | 0.46 |

[1] By reflectance measurements.

A second series of exposed plates was developed using the same developer as above, but saturated with silver nitrate. The optical densities of the most dense portions of a test pattern are given below in Table II.

TABLE II

| Exposure time: | Optical density [1] |
|---|---|
| 1/1000 | 0.14 |
| 1/100 | 0.22 |
| 1/10 | 0.48 |
| 1/5 | 0.55 |

[1] By reflectance measurements.

Other plates were prepared by precipitating $ZrO_2$, $ZnS$, $PbO$, $MgO$, $ThO_2$, and $CeO_2$ onto glass. All these materials were exposed as in this example, and either gave visible images directly (on long exposure) or after development involving image intensification.

EXAMPLE 4

Semiconductor-filled papers containing about 20% of semiconductor pigment by weight of dry fiber were prepared in conventional papermaking apparatus by adding a slurry of the semiconductor to a beater having a Canadian Standard Freeness of about 250 cc. and free of alum, size, etc. Papers containing TiO$_2$ and ZnO respectively were prepared in this fashion and had the properties given in Table III.

TABLE III

| Pigment | Percent ash | Sheet basis weight | B and L opacity | I.P.C. brightness |
|---|---|---|---|---|
| N.J. Zinc Co. "R720" rutile TiO$_2$ | 22.9 | 42.0 | 97.5 | 92.5 |
| N.J. Zinc Co. "Kadox-15" zinc oxide | 23.4 | 43.6 | 91.2 | 91.4 |

Sheets of the TiO$_2$-filled paper were sensitized by immersion for 15 minutes in methanol saturated with silver nitrate, then removed and air dried. Different sheets were exposed in the "Graflex" arrangement of Example 1 at exposure times between $1/1000$ and $1/5$ second. Some of the exposed sheets were then developed several minutes in a solution containing 1 gm. "Metol," 20 ml. H$_2$O, 2.5 gm. hydroquinone, 80 ml. methanol, and 2 gm. citric acid. After development, the sheets were rinsed in methanol and then thoroughly washed in water. The greatest optical densities measured by reflectance in the developed and washed prints varied between 0.27 and 0.57 as exposure time increased from $1/1000$ to $1/5$ second.

Other sheets, similarly exposed, were developed with a variety of developers including acidified methanol solutions of chlorohydroquinone, dichlorohydroquinone, bromohydroquinone, p-phenylenediamine, "Amidol" (2,4-diamonophenol), and "Phenidone" (1 - phenyl - 3-pyrazolidone).

EXAMPLE 5

A commercial ZnO coated paper ("Electrofax" white) was exposed to an ultraviolet light image in the arrangement of Example 2 for 4 minutes. The exposed sheet was then contacted with a solution containing 0.05 gm. of methylene blue dye in 200 ml. of methanol. Bleaching of the dye occurred in the light-struck areas, forming a visible image on the paper.

EXAMPLE 6

A weak, only faintly colored solution of KMnO$_4$ was applied to a sheet of the commercial paper of Example 5 and exposed to ultraviolet light through a template, with reduction of the KMnO$_4$ in the light-struck areas. On contact with a methanol solution of benzoyl leuco methylene blue, the leuco dye was converted to the oxidized green form of the dye in those portions of the paper which had not been illuminated and where KMnO$_4$ was still present.

EXAMPLE 7

A TiO-filled paper was immersed in a 0.5% aqueous solution of H$_2$O$_2$ and exposed for 2 minutes to an ultraviolet light image in the arrangement of Example 1. The exposed paper was then immersed in a solution containing about 5 gm. KI in 300 ml. of methanol. Where light had not struck the paper and had not caused decomposition of the H$_2$O$_2$, a brown iodine color was formed, producing a positive of the original image.

EXAMPLE 8

Commercial Rose and white ZnO coated papers were exposed to an ultraviolet light image in the arrangement of Example 1 for times up to one minute, and were than immediately immersed in methanol saturated with AgNO$_3$. No visible image was developed. The papers were partially dried, but while still wet were uniformly exposed simultaneously to an ultraviolet source principally generating the 3650 A. Hg line, as well as to an infra-red source. An image formed in the paper in about 30 seconds to one minute.

EXAMPLE 9

Commercial baryta paper was coated with a slurry of finely divided titanium dioxide in an aqueous solution of polyvinyl alcohol. The coated paper was then dried. The slurry employed comprised 9% by weight of polyvinyl alcohol in water, 15% by weight of commercial TiO$_2$ (rutile) of a particle size between 0.3–0.4 micron. The paper was sensitized by contacting a saturated methanolic solution of silver nitrate and then exposed to a 200 watt commercial photoflood lamp at a distance of 12 inches from the paper for 0.6 second using a photographic negative as an object.

The exposed paper was developed in a methanolic solution comprising 1% by weight of phenidone and 9% by weight of citric acid. Image formation occurred within ten seconds. The developed paper was then fixed by contacting a methanolic solution comprising 7% by weight of potassium thiocyanate. The fixed paper was then dried in air.

What is claimed is:

1. A process for recording an image pattern of activating radiation as a positive of an original, comprising exposing to an image pattern of activating means a copy medium comprising an inorganic photoconductor compound formed between a metal and a non-metallic element of Group VI-A of the Periodic Table which becomes activated upon exposure to said activating means and thereby capable of causing chemical reactions at portions of said medium corresponding to said image pattern of activating means, and either prior to or subsequent to the exposure step of substantially uniformly contacting said medium with the first component of a two component image-producing agent reacting on contact at said activated portions to form reaction products which will not undergo an oxidation/reduction reaction with a second component of the image-producing agent, and then contacting said medium with the second component of the image-producing agent which undergoes an oxidation/reduction type reaction with the non-exposed portions of the copy medium to thereby form an irreversible image in the non-exposed areas.

2. A process as in claim 1 wherein the photosensitive compound is selected from at least one member of the group consisting of zinc oxide, titanium dioxide, zirconium dioxide, zinc sulfide, lead oxide, silicon dioxide, aluminum oxide, chromium oxide, magnesium oxide, thorium dioxide and cerium dioxide.

3. A process as in claim 2 wherein the photosensitive compound is a particulate titanium dioxide dispersed in a binder or in a fibrous web of paper.

4. A process as in claim 1 wherein said first component is an oxidizing agent and wherein said second component is a reducing agent.

5. A process as in claim 1 wherein said first component is a peroxide or permanganate oxidizing agent and wherein said second component is a material which will react with the reactive first component remaining in the unexposed portions of the copy medium.

6. A process for recording an image pattern of activating radiation as a positive of an original comprising exposing a copy medium comprising a photoconductor formed between a metal and a non-metallic element of Group VI-A of the Periodic Table to thereby produce a latent image, substantially uniformly contacting the copy medium with an image-producing agent which undergoes an oxidation/reduction type reaction when contacted with exposed portions of the copy medium to thereby make these exposed portions nonreactive with a second image-forming material, then contacting the thus processed copy medium with a second image-forming material which undergoes an oxidation/reduction type reaction with the nonexposed portions of the copy medium to form an irreversible image in these nonexposed areas of the copy medium.

7. A process as in claim 6 wherein the second image-forming material reacts with the nonreacted first image-producing agent in the nonexposed areas to produce a visible image in these areas of the copy medium.

8. A process as in claim 7 wherein the photoconductor comprises titanium dioxide or zinc oxide.

9. A process as in claim 1 wherein the photoconductor comprises titanium dioxide or zinc oxide.

References Cited

UNITED STATES PATENTS

| | | | |
|---|---|---|---|
| 1,970,869 | 8/1934 | Schloemann | 96—59 |
| 2,150,704 | 3/1939 | Ville | 96—59 |
| 2,193,023 | 3/1940 | Evans et al. | 96—59 |
| 3,320,064 | 5/1967 | Hanson et al. | 96—48 |
| 3,309,198 | 3/1967 | Robillard | 96—48 |
| 3,192,045 | 6/1965 | Barr | 96—90 |
| 3,025,160 | 3/1962 | Bunge et al. | 96—1.8 |
| 3,052,540 | 9/1962 | Greig | 96—1 |
| 3,380,823 | 4/1968 | Gold | 96—27 |
| 3,464,820 | 9/1969 | Michalchik | 96—1.8 |

NORMAN G. TORCHIN, Primary Examiner

W. H. LOUIE, JR., Assistant Examiner

U.S. Cl. X.R.

96—48 PD, 88, 1.5, 1.8, 27 E